United States Patent [19]

Sephton

[11] Patent Number: 4,511,432

[45] Date of Patent: Apr. 16, 1985

[54] FEED DISTRIBUTION METHOD FOR VERTICAL TUBE EVAPORATION

[76] Inventor: Hugo H. Sephton, 120 York Ave., Kensington, Calif. 94708

[21] Appl. No.: 415,088

[22] Filed: Sep. 7, 1982

[51] Int. Cl.³ .......................... B01D 1/08; B01D 1/10
[52] U.S. Cl. ............................. 159/47.1; 159/DIG. 4
[58] Field of Search ..................... 159/13 A, 14, 27 R, 159/43.1, 47.1, 47.2, 47.3, 49, DIG. 4, DIG. 20; 165/DIG. 20

[56] References Cited

U.S. PATENT DOCUMENTS

| | | | |
|---|---|---|---|
| 3,400,754 | 9/1968 | Barbu et al. | 159/13 A |
| 3,423,294 | 1/1969 | Sephton | 159/13 A |
| 3,457,982 | 7/1969 | Sephton | 159/13 A |
| 3,846,254 | 11/1974 | Sephton | 159/13 A |
| 4,017,355 | 4/1977 | Kiyota et al. | 159/DIG. 4 |

FOREIGN PATENT DOCUMENTS 188608 1/1937 Switzerland ........................ 159/14

OTHER PUBLICATIONS

Sephton; "Interface Enhancement for Vertical Tube Evaporation of Seawater"; 4th Internat'l Sym. on Fresh Water from the Sea; vol. 1; pp. 471–480; 1973.

Sephton; "Renovation of Power Plant Cooling Tower Blowdown . . . "; EPA-600/777-063; Jun. 1977; pp. 12–17.

Sephton; "Upflow Vertical Tube Evaporation of Sea Water . . . "; Desalination; 16; pp. 1–13; 1975.

Primary Examiner—Bradley Garris
Attorney, Agent, or Firm—Townsend and Townsend

[57] ABSTRACT

An improved upflow vertical tube evaporator is characterized by providing a distributor plate located within a certain critical distance or gap of the tube inlets in order to dampen cross flow between the tubes. The critical gap for providing stable operation is disclosed as lying between 0.01 and 0.2 of the average tube diameter. In the preferred embodiment, the distributor plate is capable of being translated relative to tube inlets so that the gap may be widened beyond the critical dimension during periods of stable flow in order to decrease the tube-side pressure drop and increase the heat transfer.

10 Claims, 6 Drawing Figures

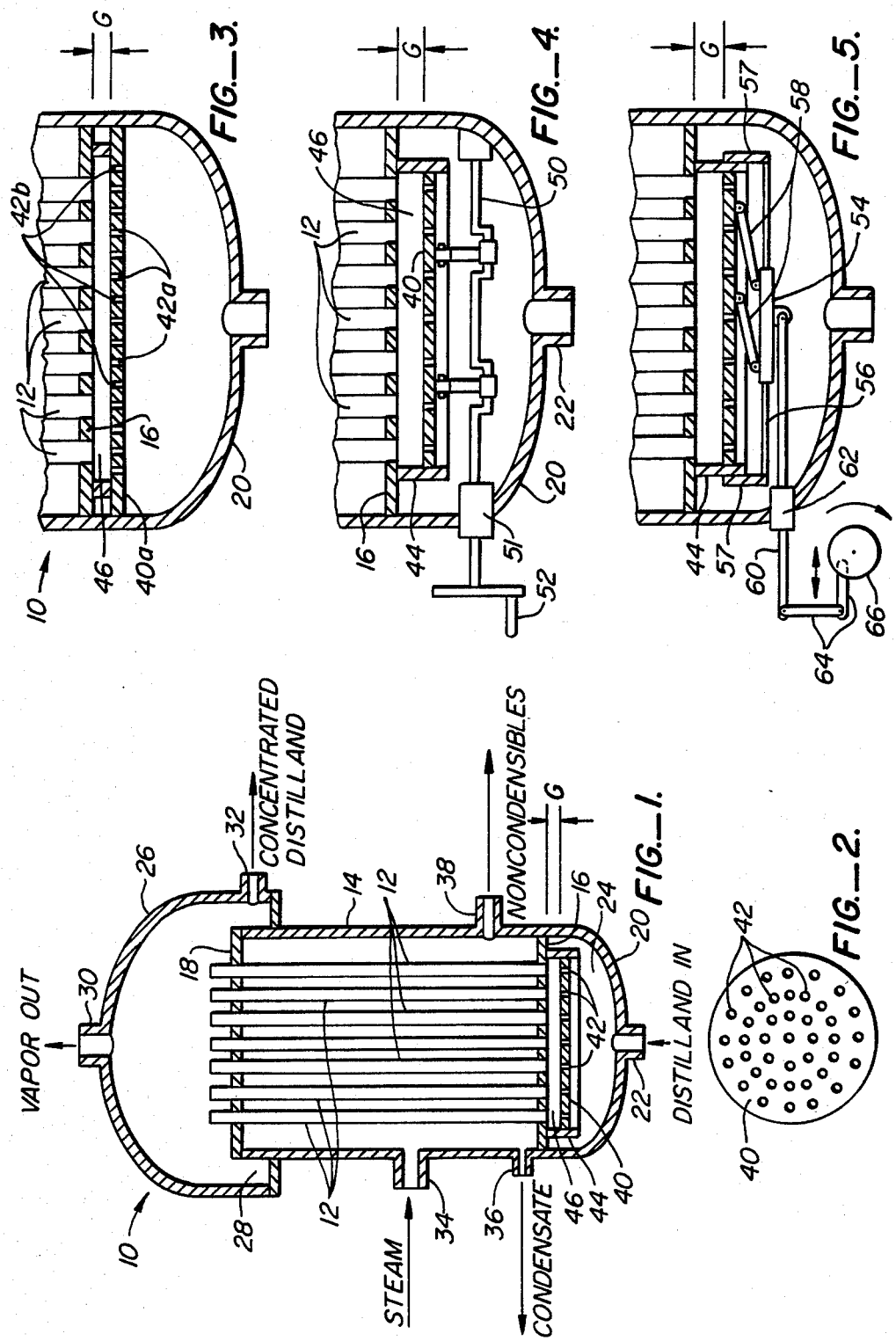

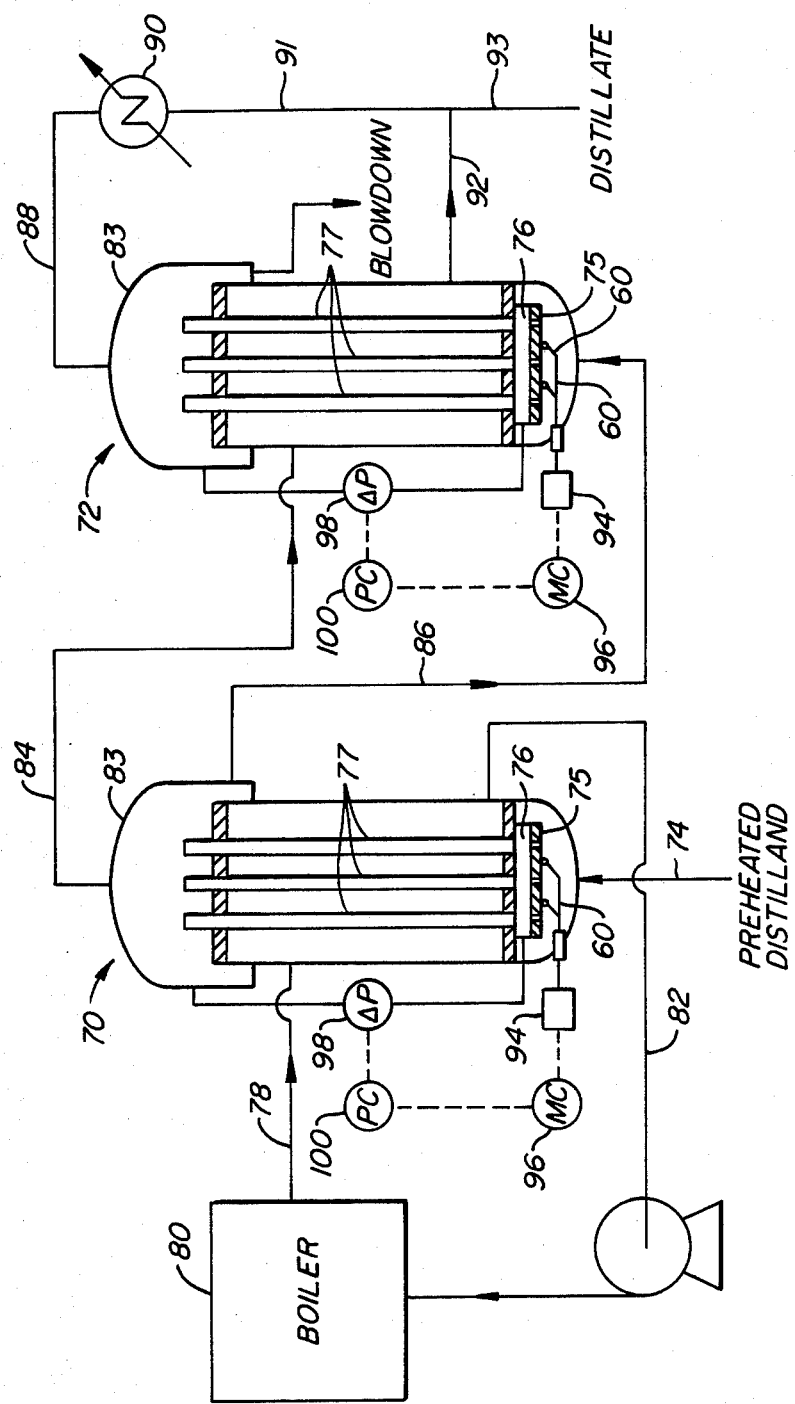
FIG._6.

FEED DISTRIBUTION METHOD FOR VERTICAL TUBE EVAPORATION

BACKGROUND OF THE INVENTION

1. Field of the Invention

The present invention relates generally to a method and apparatus for performing upflow vertical tube evaporation, and more particularly it relates to an improved system for distributing a liquid feed among a plurality of vertical tubes.

Conventional vertical tube evaporators typically comprise a multiplicity or bundle of parallel heat transfer tubes extending through a heating vessel, such as a steam jacket. Such vertical tube evaporators may operate in either a downflow or an upflow mode, the latter being the subject of the present invention. In the upflow configuration, the liquid to be evaporated, referred to as the distilland, enters the evaporator through a plenum formed below the open heat transfer tubes. Heat is supplied to the liquid by the steam condensing on the outer surfaces of the tubes, and an upward flow of the distilland is induced by the flow of vapor which is generated by evaporation. The remaining liquid distilland reaching the top of the evaporator is collected in an outlet plenum and either recycled to the inlet plenum or passed on to a second stage evaporator. The vapor separates from the liquid in the outlet plenum and, thereafter, is either condensed or used as a heating medium in a subsequent stage or effect.

The heat transfer coefficient achieved with the evaporators of the type just described are typically on the order of 1000 BTU/(hr)(ft$^2$)(°F.). The heat transfer coefficient may be increased, however, by adding a foam-producing surfactant to the distilland and reducing the pressure on the distilland as it enters the inlet end of the heat transfer tubes. The resulting foam enhances the heat transfer rate to the liquid by from 100-200%. The foamy annular layer flows over the inner wall of the tube while a vapor phase core separates along the axis of the tube and is able to flow to the outlet unhindered by the liquid phase flow. Such flow dynamics reduce the pressure drop through the tube bundle, allowing operating at lower pressures which favor evaporation. Moreover, the foamy nature of the liquid layer reduces its thermal resistance which further favors evaporation.

Hydrodynamic instability of the two-phase flow through the vertical tubes of the evaporator is problematic in both conventional and foamy flow. Such flow instability increases the pressure drop across the evaporator tubes which inhibits evaporation. Moreover, the hydrodynamic instability can lead to excessive mechanical vibration which can damage the evaporator as well as attached piping.

Hydrodynamic instability can result from a number of causes and is particularly troublesome during the start-up of a cold evaporator. Ideally, each tube in the evaporator tube bundle should operate with equal flow under approximately equal tube-side pressure drop. Instability results, however, when individual tubes or groups of tubes in the bundle experience surging or pulsating flow which may result from a variety of disturbances. Most commonly, excessive liquid will build up in a tube, and flashing of the liquid to vapor causes liquid to flow downward. The liquid which is expelled into the inlet plenum increases the hydrostatic pressure in that plenum which in turn causes a surge of liquid into the non-flashing tubes. Excess liquid then accumulates in the non-flashing tubes which can cause further flashing, eventually leading to an oscillating cross flow between the tubes at the tube inlet ends. This problem is most acute during start-up of the evaporator when the tubes are filled only with liquid and may heat at different rates. Flashing almost always initiates in individual tubes or groups of tubes prior to initiating in others, rendering evaporator start-up difficult or impossible. The problem is particularly acute in large evaporators (i.e., those having more than about 20 tubes) since differential heating of the tubes is virtually unavoidable.

Vertical tube foaming evaporators are somewhat less prone to the flow disturbances just described than are non-foamy flow evaporators, but such instability remains a serious concern. Such evaporators typically employ a distributor plate spaced below the inlets to the heat transfer tubes. The distributor plate includes a number of orifices which induce foaming as the distilland passes through. The spacing of the distributor plate, however, creates a manifold which can transmit flow disturbances from one tube or group of tubes to another, exacerbating the problems just described.

It is therefore desirable to provide a method and a system for operating vertical tube evaporators, and in particular vertical tube foaming evaporators, which effectively inhibits such undesirable flow characteristics from arising and which can dampen such flow once it has begun.

2. Description of the Prior Art

U.S. Pat. No. 3,846,254 to Sephton describes the construction and use of both upflow and downflow vertical tube evaporators as well as the practice of vertical tube foaming evaporation. The distance or gap between the distributor plate and the inlet ends of the tubes is taught to be up to several inches to provide for maximum turbulence and foaming immediately upstream of the tube inlets. Sephton, Desalination (1975) 16:1–13, discloses an upflow vertical tube evaporator having a distributor plate with a three inch gap between the distributor plate and the tube inlets. Sephton, Proc. of the Fourth Int. Symposium on Fresh Water from the Sea (1973) 1:471–480, discusses the problem of hydrodynamic instability in an upflow vertical tube foaming evaporator having an 18-tube bundle. U.S. Department of Commerce Publication (NTIS) PB-271 022, "Renovation of Power Plant Cooling Tower Blowdown for Recycle by Evaporation Crystallization with Interface Enhancement," June 1977, discloses the use of an upflow vertical tube evaporator having a distribution plate with an experimentally variable gap between its upper surface and a lower tube sheet which defines the tube inlets. A conventional upflow evaporator employing a plurality of nozzles in a fixed plate located beneath the tube inlets is described in Swiss Pat. No. 188,608.

SUMMARY OF THE INVENTION

The present invention is an improved method and system for operating an upflow vertical tube evaporator. The invention results from two discoveries. First, it has been observed that flow instabilities in a multiple tube evaporator may be reduced or eliminated entirely by damping the cross flow which occurs between heat transfer tubes in the manifold defined between the distributor plate and the tube inlets. Second, it has been observed that the total pressure drop through the tube side of such an evaporator is a function of the degree of damping of the cross flow between tube inlets. As described hereinabove, the pressure drop is inversely related to the heat transfer coefficient achieved. Based on these observations, a novel structure and method for operating a vertical tube evaporator has been developed.

In its broadest form, the structure is characterized by locating the distributor plate within a certain critical distance of the tube inlets in order to assure sufficient damping of the cross flow to provide stable operation of the evaporator. The criticality of this parameter has heretofore not been recognized and it is virtually impossible to start-up large-bundle evaporators (i.e., those exceeding approximately 100 tubes) where the spacing is greater than the upper limit provided herein.

In the most preferred embodiment, the distributor plate is movable relative to the tube inlets to provide a variable damping or resistance to cross flow. In this way, during periods of unstable flow, the cross flow between the inlet ends can be damped until the flow returns to normal. Moreover, heat transfer can be optimized by continuously adjusting the position of the distributor plate in order to minimize the tube-side pressure drop.

DESCRIPTION OF THE SPECIFIC EMBODIMENTS

Referring to FIG. 1, a vertical tube evaporator 10 comprises a plurality of vertical heat transfer tubes 12 mounted within a heating jacket 14, typically a steam jacket. The steam jacket 14 includes a steam inlet 34, a condensate outlet 36 and a non-condensibles outlet 38. The tubes 12 terminate at their lower ends in an inlet tube sheet 16 and pass through an outlet tube sheet 18 at their upper ends. A lower dome 20, having a liquid inlet 22, seals against the inlet tube sheet 16 to define an inlet plenum 24. An upper dome 26 similarly encloses the upper tube sheet 18 and is joined to the evaporator 10 a short distance down from the top of the heating jacket 14 to define an outlet weir 28. The upper dome 26 includes a vapor outlet 30 at its upper end and a liquid outlet 32 in fluid communication with the weir 28.

The detailed construction of the evaporator may be varied depending on the particular process conditions. In particular, the materials of construction will be selected to be compatible with the process fluids and temperatures. The configuration and dimensions of the evaporator may also vary within wide limits. The heat transfer tubes will usually be cylindrical, although other cross sections would also be functional. Similarly, the process vessel defining the evaporator will usually, although not necessarily, be cylindrical. The number of tubes will depend on both the desired throughput and on the size of the individual tubes. The tubes will usually have equal dimensions to provide equal flow through each tube, typically having diameters of from 2 to 3 inches.

To this point, the description of the evaporator 10 is typical for evaporators employed both for conventional vertical tube evaporation and for vertical tube foaming evaporation. When operating as a foamy evaporator, the vertical tube evaporator 10 will usually also include a distributor plate 40 (FIG. 2) having the plurality of orifices 42 formed therein. The particular distributor plate 40 illustrated is circular and intended for use in evaporators having circular cross sections. Other cross sections could be employed. The pattern of orifices 42 in the plate 40 matches the pattern of tubes 12 in the inlet tube sheet 16. Normally, the plate 40 will be mounted so that the orifices 42 are aligned with the tubes 12, but not always, as will be discussed hereinafter. The orifice diameters are substantially smaller than the tube diameters, with diameters in the range from 0.125 to 0.75 being most useful.

As illustrated in FIG. 1, the distributor plate 40 is mounted on ring 44 which holds the plate a spaced-apart distance from the inlet tube sheet 16. Thus, the ring 44, the plate 40 and sheet 16 together define a manifold 46 which, as will be described in greater detail hereinafter, allows liquid entering from any one of the orifices 42 to flow to any individual tube 12. The use of the ring 44 to mount the plate 40 is convenient, but not necessary. The plate 40a could be attached directly to the interior wall of the lower dome 20 (see FIG. 3).

Although distributor plates, such as plate 40 illustrated in FIG. 1, have primarily been utilized in connection with vertical tube foaming evaporators, the flashing effect provided by such plates, described in detail hereinafter, will also enhance the operation of evaporators operating in a non-foaming mode and the present invention is not limited to foaming evaporation.

In foaming evaporation, a small amount of surfactant is added to the liquid to be evaporated (the distilland) which then enters the evaporator through inlet 22 into inlet plenum 24. By superheating the distilland, typically from about 0.5° to 5.0° F. relative to the saturation temperature in the manifold 46, a portion of the feed flowing through each orifice will flash as it passes through the orifices 42. Such flashing is desirable, since it initiates two-phase flow in the liquid prior to entering the heat transfer tubes 12. Moreover, the flashing initiates the foaming of the liquid which is essential for proper operation. See U.S. Pat. No. 3,846,254, the disclosure of which is incorporated herein by reference, for a complete description of foaming evaporation.

In general, it is desirable to provide a relatively large gap between the distributor plate 40 and the tube sheet 16. Such a gap is beneficial since it allows substantially unrestricted cross flow between the various orifices and each of the transfer tubes 12. In this way, the inlet pressure to each tube 12 is substantially the same as that for all other tubes, and the flow through each of the tubes is equalized. By thus maintaining a parallel, uniform flow throughout the tube bundle, the effective temperature difference driving the heat transfer is utilized to the greatest efficiency.

Flow instabilities, however, can disrupt the uniform flow pattern through the tube lowering the efficiency of heat transfer. Three particularly troublesome and disruptive conditions have been observed. First, oscillations between two or more large groups of tubes can occur during start-up or after flow in either group has been disturbed. Second, rotary-wave discharge patterns are observed with cylindrical tube bundles. The third instability pattern is characterized by a random pattern of vapor and liquid eruption from different tubes. No distinct pattern or sequence of oscillation is observed. In each case, instability is accompanied by a relatively high tube-side pressure drop and a relatively low heat transfer rate to the distilland. In addition to reducing the effective heat transfer to the distilland, such instability can impose substantial hydrodynamic forces upon the evaporator, causing oscillations or vibrations that can damage the evaporator. These problems increase proportionally with the number of tubes simply because the likelihood of at least one tube suffering a disturbance and initiating unstable flow is greater.

The most simple solution for the problem of flow instability in the tube bundle is illustrated in FIG. 1. By placing the distributor plate 40 within a certain critical distance (dimension G) of the inlet tube sheet 16, cross flow between the two inlets can be damped. This is desirable because back flow resulting from flashing in the tubes is less able to exert an effect on adjacent tubes in the bundle. The critical gap between the inlets of the tubes 12 and the distributor plate 40 has been found to be in the range from 0.01 to 0.20 of the average tube width, preferably in the range from 0.05 to 0.1 of the average tube width.

As illustrated in FIG. 1, the distributor plate 40 is substantially parallel to the inlet tube sheet 16. Although this will usually be the case, some variation in the spacing can be permitted so long as spacing does not deviate from the critical range at any point. Also, the tubes 12 are illustrated as having equal diameters. Again, this is the most convenient method for forming the evaporator, but the tubes can have other cross sections and the tube width can vary somewhat. Deviations in tube width are, however, limited since tubes having different diameters will usually have different flow rates (under equal differential pressures), disturbing the uniform flow rate through the bundle and leading to instabilities.

FIG. 3 illustrates the lower portion evaporator 10 having a modified distributor plate 40a which includes both orifices 42a which are substantially coaxial with the tubes 12 and interstitial orifices 42b which are located intermediate the orifices 42a. The interstitial orifices allow a portion of the liquid feed to impinge against the inlet tube sheet 16, ensuring that the manifold volume 46 remains flooded. Such flooded condition is desirable to promote equal flow to all tubes (e.g., when one or more of the orifices 42a or 42b have become plugged) and to prevent dry or stagnant operation in the manifold which can lead to scaling from salts present in the feed.

The interstitial orifices 42b will usually be smaller than the coaxial orifices 42a, typically in the range from 0.05 to 0.2 inches and will usually pass a smaller portion of the total flow. The number, size and positions of both the coaxial orifices 42a and interstitial orifices 42b will depend on the process conditions including evaporation temperature, feed viscosity, presence of particulates, foamability of the feed, tube dimensions and the fixed orifice spacing from the tube inlets.

In a third alternative (not illustrated), the distributor plate will have interstitial orifices with few or no orifices coaxial with the heat transfer tube. This design ensures that the manifold is filled with the two-phase distilland at all times, but suffers from somewhat higher pressure loss.

The use of the distributor plate 40 (or 40a) having a fixed gap G is desirable in that it is the least expensive solution to the problem of flow instability. However, as described above, during stable operation it is desirable to provide a larger gap, typically on the order of from one to four inches, more typically in the range from two to three inches. The provisions of a fixed distributor plate, of course, does not allow the gap to be enlarged during periods of stable flow.

For that reason, it is desirable to provide a distributor plate 40, wherein the gap between the distributor plate 40 and the inlet tube sheet 16 may be varied during operation of the evaporator. Referring now to FIGS. 4 and 5, two particular embodiments providing such adjustability will be described. In both embodiments, the distributor plate 40 is illustrated with coaxial orifices 42, as described in reference to FIG. 1. The embodiments would function equally well with the distributor plates having interstitial orifices described above.

In FIG. 4, the distributor plate 40 is slidably mounted within the ring 44 which is attached to the tube sheet 16. The ring 44 will typically extend a distance of about five inches below the tube sheet 16 to provide a manifold 46 which is variable from approximately zero to the full five inches. By then mounting the distributor plate 40 on a crankshaft 50 which penetrates the dome 20 through a vacuum seal 51, rotation of the shaft by handle 52 allows the gap G to be narrowed or widened depending on the flow conditions. As illustrated, of course, the position of the distributor plate 40 is manually adjustable and typically the gap will be narrowed during start up and widened after stable flow has been achieved. Thereafter, only if the operator observed flow instabilities would the gap be changed at all.

A second embodiment of the adjustable distributor plate is illustrated in FIG. 5. A carriage assembly 54 is mounted on a horizontal bar or track 56 which is suspended from the ring 44 by hangers 57, as illustrated. Two or more connecting rods 58 are pivotally attached at their upper ends to the distributor plate 40 and at their lower ends to the carriage assembly 54. A reciprocating rod 60 penetrates the lower dome 20 through a vacuum seal 62 so that movement back and forth of the rod 60 causes the distributor plate 40 to translate up and down. As illustrated, the rod 60 is connected through link arms 64 to a drive wheel 66. The drive wheel 66 may be driven by a step motor (not shown) to allow remote actuation of the distributor plate 40.

Many other mechanisms can be devised for adjusting the elevation of the distributor plate 40. The above two examples are only illustrative of the possible mechanisms and are not intended to limit the scope of the present invention.

Moreover, the present invention should not be limited to adjusting the gap between the distributor plate and the inlet tube sheet as the only means for adjusting the resistance to cross flow. Other mechanisms could be devised, including raising only portions of the distributor plate, placing butterfly-type valve elements at various places to impede cross flow, and the like. The use of the mechanism for elevating the distributor plate 40 is, however, preferred and used for exemplary purposes.

Referring now to FIG. 6, operation of the vertical tube evaporators of the present invention will be described in reference to a two-effect evaporator. A first effect evaporator 70 is provided in series with a second effect evaporator 72, both evaporators being substantially the same. Preheated distilland enters the first effect evaporator 70 through line 74 at the bottom and passes upward through a distributor plate 75. The feed is preheated slightly above the saturation temperature of the distilland at the pressure downstream from the distributor plate 75 so that a portion of the distilland flashes as it enters the manifold 76. The resulting two-phase, foaming liquid flows upward through heat transfer tubes 77 and is evaporated in the manner described in U.S. Pat. No. 3,846,254. Heat is supplied to the evaporator 70 by steam supplied through line 78. Condensate returns to the boiler 80 through return line 82.

The two-phase mixture discharged from the top of the heat transfer tubes 77 separates into vapor and liquid phases in upper plenum 83. The vapor phase is directed through line 84 to the heating jacket of evaporator 72 where it acts as the heating medium. The concentrated distilland also passes on to the second effect evaporator 72 through line 86 and serves as the feed for the next stage. The overhead vapor from the second evaporator 72 is discharged through the line 88 and condensed in condenser 90. The condensate 91 joins the condensate 92 from the steam jacket of evaporator 72 and both are discharged as distillate through line 93.

Both evaporators 70 and 72 are provided with adjustable distributor plates 75 as described previously in reference to FIG. 5. Step motors 94 are connected to rods 60 through appropriate linkages. Motor controllers 96 are provided to actuate the motors so that the gap between the distributor and the tube inlets can be continuously controlled during operation of the evaporators.

It has been found that flow instabilities always lead to a higher tube-side pressure drop, and the preferred control scheme is based on this observation. A differential pressure sensor 98 measures the tube-side pressure drop from a point adjacent the tube 77 inlets to a second point in the upper plenum 83 of the evaporator. The differential pressure signal is then fed to a pressure controller 100 which will optimize the elevation of the distributor plate 75 to provide minimum differential pressure across the tubes. As discussed hereinbefore, such a minimum pressure drop relates directly to the maximum effective heat transfer and the most efficient operation of the evaporator.

Typically, the controller 100 will be a microprocessor-based controller utilizing a specialized control algorithm for maintaining minimum differential pressure. For example, the controller may initiate slight changes in the plate elevation and observe the effect on tube-side differential pressure. In this way, the minimum differential can be determined. Other more sophisticated control programs are commercially available and are well known in the art.

Although the foregoing invention has been described in some detail by way of illustration and example for purposes of clarity of understanding, it will be obvious that certain changes and modifications may be practiced within the scope of the appended claims.

What is claimed is:

1. A method for operating an evaporator which includes a plurality of vertical heat transfer tubes having feed inlets at the lowermost ends thereof, a tube mounting member sealingly connected to said tubes at said lowermost ends, a liquid inlet plenum enclosing the lower ends of the tubes, a distributor plate located within the inlet plenum and having a multiplicity of orifices therethrough, said distributor plate being normally spaced from the inlet ends of the tubes to form a gap with said mounting member defining a manifold which interconnects said inlets to allow cross flow therebetween, and an outlet plenum enclosing the upper ends of the tubes, said method comprising:
    feeding a liquid to be evaporated to the inlet plenum so that the liquid flows through the orifices in the distributor plate into the manifold and thereafter into the tubes, and
    damping cross flow oscillation between the inlet ends of two or more tubes or tube groups by adjusting said gap to be in the range from 0.01 to 0.2 of the average tube width, to improve heat transfer in said evaporator.

2. A method as in claim 1, further comprising adding a foam-producing surfactant to the liquid to be evaporated whereby the rate of heat transfer to the liquid is increased.

3. A method as in claim 1, wherein the liquid is heated prior to passing through the orifices so that a portion of the liquid flashes as it enters the manifold to produce a foamy mixture which enters the tubes.

4. The method of claim 1 which includes the steps of:
   (a) discharging said liquid from a first group of said distributor plate orifices coaxially into said inlet ends of said tubes,
   (b) and discharging said liquid from a second group of said distributor plate orifices into impinging relationship with said tube mounting member between said inlet ends of said tubes.

5. The method of claim 4 which includes the step of discharging different amounts of fluid through each of said first group of orifices than through each of said second group of orifices.

6. A method as in claim 1, further comprising:
    measuring the tube-side pressure drop through said tubes; and
    wherein said cross flow oscillation is damped by adjusting said gap in order to minimize the pressure drop through the vertical tubes and to maximize the heat transfer efficiency of said evaporator.

7. The method of claim 6 which includes the step of adjusting said gap in response to the measured tube-side pressure drop through said vertical tubes.

8. The method of claim 6 which includes the step of adjusting said gap automatically in response to the measured tube-side pressure drop through said vertical tubes.

9. The method of claim 6 or 8 which includes the steps of:
   (a) adjusting said gap during initial start-up of said evaporator so that said gap is in the range of 0.01 to 0.2 of the average tube width,
   (b) and subsequently adjusting said gap, after start-up and stable operation has been achieved, to minimize tube-side differential pressure drop and maximize the heat transfer efficiency of said evaporator.

10. The method of claim 9 wherein step (b) comprises adjusting said gap to about one to about four inches.

* * * * *